(12) United States Patent
Grosskurth et al.

(10) Patent No.: US 7,830,529 B2
(45) Date of Patent: Nov. 9, 2010

(54) OPTICAL MEASUREMENT OF METALLIC SURFACES

(75) Inventors: Benjamin Grosskurth, Munich (DE); Wilhelm Satzger, Munich (DE)

(73) Assignee: MTU Aero Engines GmbH, Munich (DE)

( * ) Notice: Subject to any disclaimer, the term of this patent is extended or adjusted under 35 U.S.C. 154(b) by 295 days.

(21) Appl. No.: 12/084,671

(22) PCT Filed: Nov. 8, 2006

(86) PCT No.: PCT/DE2006/001955
§ 371 (c)(1),
(2), (4) Date: Jul. 31, 2008

(87) PCT Pub. No.: WO2007/056974
PCT Pub. Date: May 24, 2007

(65) Prior Publication Data
US 2009/0153877 A1  Jun. 18, 2009

(30) Foreign Application Priority Data
Nov. 15, 2005   (DE) ............... 10 2005 054 373

(51) Int. Cl.
G01B 11/24 (2006.01)
G01B 11/30 (2006.01)

(52) U.S. Cl. ............... 356/601; 356/603; 356/610

(58) Field of Classification Search ... 356/237.1–241.6, 356/242.1–243.8, 426–531, 600–640
See application file for complete search history.

(56) References Cited

U.S. PATENT DOCUMENTS

| | | | | |
|---|---|---|---|---|
| 3,840,301 A | * | 10/1974 | Pryor et al. | 356/505 |
| 5,965,006 A | * | 10/1999 | Baege et al. | 205/666 |
| 7,095,886 B2 | * | 8/2006 | Massen | 382/154 |
| 2003/0234941 A1 | | 12/2003 | Mundy et al. | 356/601 |

FOREIGN PATENT DOCUMENTS

| | | |
|---|---|---|
| DE | 195 36 294 | 4/1997 |
| DE | 102 30 494 | 2/2003 |
| GB | 2 295 890 | 6/1996 |
| WO | WO 02/066924 | 8/2002 |

* cited by examiner

Primary Examiner—Gregory J Toatley, Jr.
Assistant Examiner—Jarreas C Underwood
(74) Attorney, Agent, or Firm—Davidson, Davidson & Kappel, LLC

(57) ABSTRACT

A method for optically measuring a surface is described, in particular, for a surface having a spherical form and a high reflection of radiation. The surface is illuminated by at least one radiation source, as well as by at least one structured light source, in order to produce an illumination structure on the surface to be measured, and to then record the illumination structure using a camera; prior to measuring the surface, a coating being applied thereto in order to reduce the reflected radiation, the electrostatic coating principle being followed when applying the coating to the spherical surface. Thus, a method for optically measuring a surface is described, which provides for a coating to be uniformly deposited on the entire surface of the test object and to have a thickness of less than 0.01 mm.

11 Claims, 1 Drawing Sheet

OPTICAL MEASUREMENT OF METALLIC SURFACES

This application is a national phase of International Application No. PCT/DE2006/001955, filed Nov. 8, 2006, which claims priority to German Application No. DE 10 2005 054 373.1, filed Nov. 15, 2005.

FIELD OF THE INVENTION

The present invention relates to a method for optically measuring a surface, which, in particular, has a spherical form having a high reflection of radiation, and which is illuminated by at least one radiation source, as well as by at least one structured light source, in order to produce an illumination structure on the surface to be measured, and to then record the illumination structure using a camera, prior to measuring the surface, a coating being applied thereto in order to reduce the reflected radiation.

BACKGROUND

Many methods for taking three-dimensional optical measurements of free-form surfaces provide for implementing a structured illumination of the test object. In this context, the test objects can have cylindrical or spherical and thus very complex and angled surfaces, as are prevalent, in particular, in turbine blades or BLISKs. BLISKs denote what are commonly referred to as bladed disks, as used in the compressor stages in jet engines, for example. The three-dimensional optical measurement of the surfaces may be used, on the one hand, to control dimensional accuracies, as well as to generate data records for creating electronic volume models of existing test objects. The structured illumination of the test objects encompasses fringe structures, dots or stochastic patterns, the light backscattered by the surface being recorded by a camera.

The German Patent DE 195 36 294 C2 describes applying a geometric navigation method for use with optical 3D sensors in order to take three-dimensional measurements of objects. This method is based on the principles of fringe projection and triangulation, using at least one camera, preferably a video camera, a device for digitizing and storing image sequences of the camera, at least one illumination projector, which is fixed in position relative to the camera, respectively is assigned to a plurality of cameras and which, in temporal succession, generates light structures composed of at least one-dimensional fringes, and using at least one navigation device that is fixed in the reference coordinate system and includes either reflecting and/or scattering signal markings, which are indicated by identification indices, along with an illumination device or a signal continuum. A method of this kind, which provides for using light structures to illuminate the test object surface to be measured, presupposes a surface that does not have any or that only has minimal specular reflectance. A specular property connotes, in particular, a high reflection, as is characteristic of metallic surfaces. However, a reliable implementation of the mentioned method requires that the surface have a mat, diffuse scattering reflective property. For that reason, the surface of the test object to be measured is covered with a coating that alters the optical properties of the surface in the manner mentioned above. Generally, spray (air brush) techniques are used to apply the coating, the applied material forming a white, diffusely scattering layer on the surface of the test object. This layer may include titanium dioxide, for example, since this material produces the desired properties.

The inherent difficulty that the known method must seek to overcome is ensuring that the measurement result obtained by optically measuring the free-form surfaces is not adversely affected by the coating on the surface. It is, therefore, essential that the layer be applied thinly and uniformly to the surface and, moreover, that it be readily removable again therefrom. A variation in the layer thickness results in a falsification of the measurement result, it not being possible for the coating material to be uniformly applied using the spray technique insofar as, when working with complex surface structures, such as turbine blades, for example, surfaces disposed in the inner regions or in recesses, are wetted to a lesser extent by the coating material. On the other hand, outer surfaces, such as the upper ends of turbine blades, for example, have a greater layer thickness, since, in these regions, the coating material is deposited more heavily on the surface. A single, integrated and uniform coating of the entire surface using a spray technique in accordance with the related art also necessitates producing a layer thickness that exceeds a value of 0.01 mm at least in some areas. In this instance, due to the large layer thickness, a precise measurement of the test object is no longer feasible, thereby resulting in measuring errors and thus in the generation of erroneous data records.

SUMMARY OF THE INVENTION

It is, therefore, an object of the present invention to devise a method for optically measuring a surface having a coating, which will make it possible for the coating to be uniformly deposited on the entire surface of the test object and to have a thickness of less than 0.01 mm.

In accordance with an embodiment of the present invention, a method for optically measuring a surface having a spherical form and a high reflection of radiation is provided. The method includes illuminating the surface by at least one radiation source and by at least one structured light source; producing an illumination structure on the surface to be measured; recording the illumination structure using a camera; applying a coating to the surface via an electrostatic coating process to reduce the reflected radiation; and measuring the surface. In accordance with another embodiment of the present invention, a device for performing the step of applying a coating to the surface of an object via an electrostatic coating process to reduce the reflected radiation, as provided for in the method described in an embodiment of the present invention, is also provided. The device includes an electrostatic coating device. The electrostatic coating device may include a spraying unit to discharge a coating material onto the object, a high voltage being applied between the spraying unit and the test object. The spraying unit of the electrostatic coating device may also be movable relative to the object to be coated in order to achieve a uniform layer thickness of the coating. The uniform layer thickness of the coating produced may be less than 0.01 mm. These embodiments incorporate the technical teaching which stipulates that the electrostatic coating principle be followed when the coating is deposited on the spherical surface. Using the method described above, it is possible to produce a thin and uniform coating on the surface of the test object. In this context, the coating material may be present in pulverulent form, and it is discharged from a spraying unit. With the aid of a direct-current voltage, a force field is produced between the spraying unit and the test object to be coated in that the spray head is electrically charged in opposite polarity to the test object. The fine powder particles sprayed out of the spraying unit are attracted in the electric field by the test object, in the process, these particles following the force field lines and depositing themselves on the surface of the test object. Since the electric force field completely surrounds the test object to be coated, in response to the Coulomb forces acting thereon, the powder particles are uniformly deposited on the surface of the test object. Thus, a uniform coating is able to form on the surface of the test object, there essentially being no difference in the thickness of this coating, for example, between the projecting surfaces and less accessible surfaces. Typically, a high voltage corona charging or a tribocharging is used to charge the powder material. In the corona charging process, an electrostatic field is produced by air ions; in the case of tribocharging, the powder particles being subject to friction within a flow channel in the spraying unit. In the case of pure corona charging, an electric field is applied between an electrode on the spraying unit that is connected to the high voltage (0-100 kV) and the grounded test object. Air ions, which charge the powder particles, form around the spraying unit. In the case of pure tribocharging, the powder particles are typically charged by contact when traversing a conduit located in the spraying unit; depending on the friction material, the powder material being charged with positive or negative polarity. In this context, the powder material may first be triboelectrically charged and subsequently recharged to the opposite polarity by a corona discharging. Since this leads to an improved distribution, a uniform coating on the test object may thus be obtained. In addition, when the electrostatic coating principle is applied, the amount of spray mist formed (overspray) is advantageously decreased, thereby making it possible to minimize the loss of coating material.

A white scattering and/or diffusely scattering layer is advantageously applied as a surface coating. This optical property allows the light generated by the light source, respectively the light structures, to enter the video camera without being reflected or specularly reflected, in order to be detected by the same. In particular, a white surface coating makes it possible for the light structure, which is projected onto the surface of the test object by the illumination projectors assigned to the cameras, to be more efficiently detected by the cameras, so that a white surface proves to be especially beneficial. In addition, the diffuse scattering property of the surface coating prevents unwanted specular or reflection effects, which either falsify the image captured by the camera or render an incomplete image of the test object.

In accordance with one preferred exemplary embodiment, the surface coating is applied as pulverulent material. In this context, the material has a pulverulent consistency to allow it to be supplied to the spraying unit and to be spray-discharged from the same, and to be subsequently applied to the surface of the test object. Adhesion of the pulverulent material may be accomplished by the chemical or mechanical bonding of the same to the surface of the test object. To attain the requisite optical properties, the size of the powder particles may reach the low nanometer range. The material may include a titanium dioxide, which produces a white pigmentation on the surface. In this context, the particle size of the powder material may be selected to ensure that the diffuse scattering property required for optically measuring the metal surface is obtained. Titanium dioxide is an important pigment for industrial applications, the bright white resulting from a complete scattering of the light by the pigment particles. Moreover, when combined with another medium, the pigment crystals of the titanium dioxide have such a favorable refractive index that the white color of the titanium dioxide does not become lackluster when it is mixed with water or another binding agent. Another advantage of titanium dioxide is its complete lack of toxicity, so that there is no need for a user to take elaborate precautions.

Another specific embodiment of the present invention provides for compressed air to be used when the pulverulent material for electrostatic coating is deposited on the surface. The compressed air disperses the coating material and carries it out of the nozzle orifice of the spraying unit. The pressure range of the compressed air may be between 2-8 bar, for example, higher pressures also being usable at correspondingly smaller flow cross-sections. Compressed air may be used to induce dispersion of the coating material, a purely electrostatic dispersion also being applicable, however. Once the coating material is discharged from the nozzle, the coating material moves toward the test object in response to the electromagnetic force field and is thereby deposited on the surface of the test object.

Another exemplary embodiment of the present invention provides that the pulverulent material for electrostatic coating be deposited on the surface via a substrate material. In this method for electrostatically coating via a substrate material that is an alternative to the compressed air method, the coating material is dissolved in the substrate material and, together with the same, is deposited on the surface of the test object. The test object may subsequently dry by evaporation, the titanium dioxide remaining as a uniform surface coating. The substrate material may contain a mixture of water and ethanol, water being fully miscible with ethanol. Thus, an optimal quality may be selected for the substrate material to ensure a most uniform possible coating of the test object, simultaneously accompanied by a fast drying of the surface coating.

The electrostatic coating device advantageously has a spraying unit from where the coating material is discharged, a high voltage being applied between the spraying unit and the test object. The high voltage is a direct-current voltage, it being possible for the spraying gun, respectively the spraying unit to have a negative charge, whereas the test object has a positive charge. In this context, the high voltage is generated by a high voltage generator and may assume values of between 40 kV to 150 kV and preferably between 80-100 kV. However, as a function of the distance between the spraying unit and the test object, the high voltage may also assume lower or higher values, lower values being required at a smaller distance and higher values at a larger distance to the test object.

To achieve a most uniform possible coating of the surfaces of the test object, it may be provided for the test object to be coated to be movable relative to the spraying unit, the relative movement between the test object and the spraying unit also being achievable by a movement of the spraying unit in space.

Thus, the electrostatic coating method may be utilized quite advantageously, so that the orientation of the electromagnetic flux relative to the test object to be coated is not fixed, rather a uniform and directionally independent orientation of the magnetic field flux is attainable by a movement of the test object relative to the spraying unit.

The coating of the test object surface may advantageously have a thickness value of 0.01 mm, smaller thicknesses also being possible. In the case of a coating containing a titanium dioxide material, the coating thickness may reach the low micrometer or even nanometer range, the coating thickness likewise depending on the surface quality of the test object. When the surface quality of the test object is high, a smaller coating thickness suffices, whereas a lower surface quality requires a larger coating thickness. However, it may be assumed that an optimal layer thickness is within a low micrometer range.

Other refinements of the present invention are explained in greater detail in the following, along with the description of a preferred exemplary embodiment of the present invention, with reference to the drawing.

Figure 1:
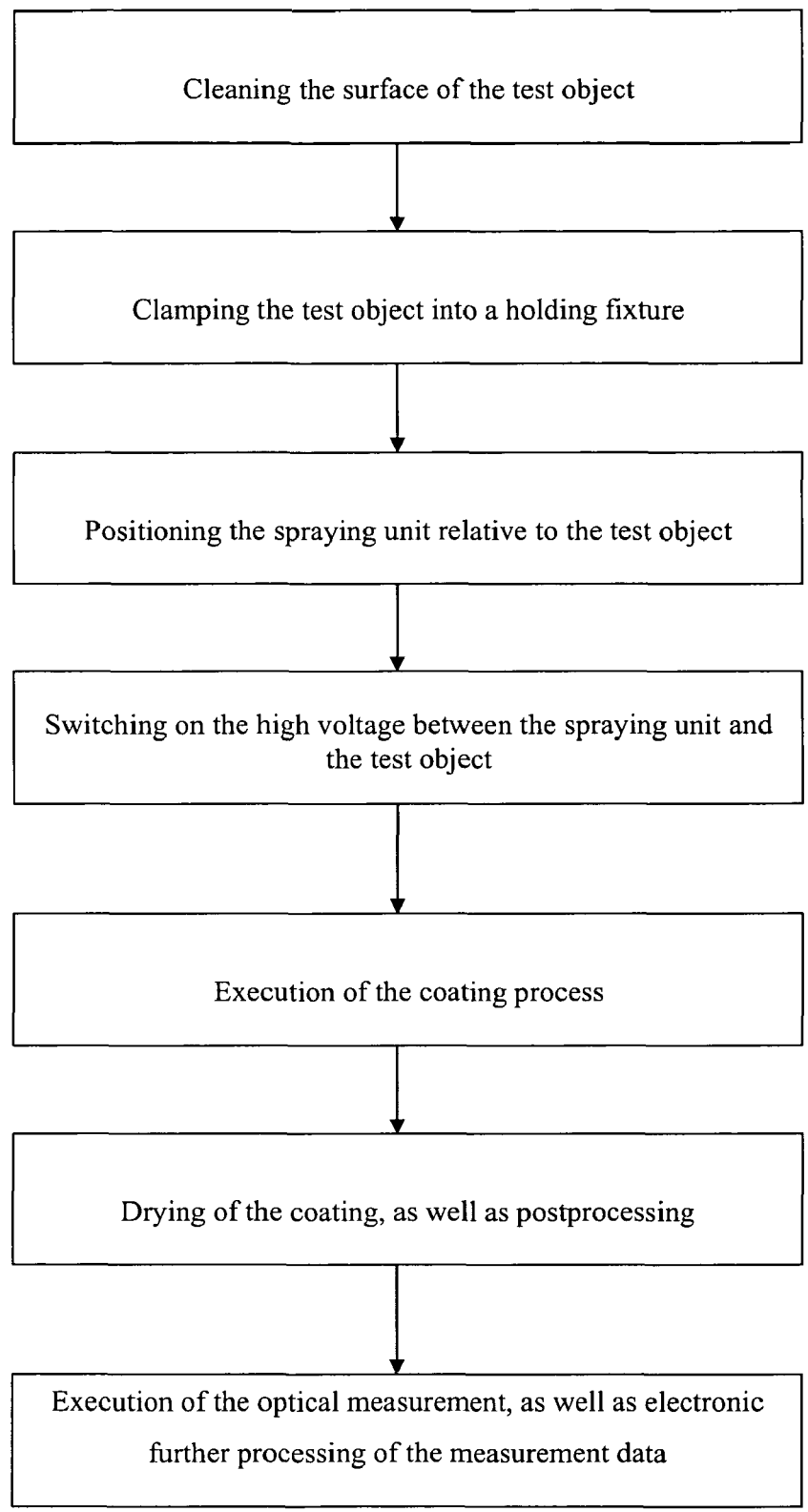
FIG. 1 shows: A flow chart for electrostatically coating test objects including the subsequent implementation of a measurement.

The flow chart illustrated FIG. 1 for electrostatically coating test objects including the subsequent implementation of the measurement is described in seven steps, which in no way signifies a limitation of the scope of protection of the method to the method steps describe in the present invention.

DETAILED DESCRIPTION

The first step of the method according to the present invention includes cleaning the surface of the test object to ensure that it is free of foreign bodies and surface impurities. This makes it possible to prevent a faulty measurement, as well as a potentially deficient adhesion of a subsequent surface coating. In another step, the test object is clamped into a holding fixture. In this context, the holding fixture may be a rotating or a sluing mechanism which rotates or turns the test object relative to the spraying unit. The test object is preferably clamped in at surface locations which are not picked up by the optical sensing elements, respectively which have no particular relevance to the measurement data record. This is due primarily to the fact that the surface cannot be coated at the locations where the test object is held by the holding fixture since no coating material is able to be deposited at those locations.

The spraying unit is positioned relative to the test object in another method step, this step including, in particular, the orientation of the spraying head and the determination of the spraying distance. The high voltage is subsequently switched on between the spraying unit and the test object. The feeding of the high voltage is preferably accomplished via the holding fixture by contact with the test object. Once the high voltage is switched on, respectively applied to the test object, the coating operation is executed. In the process, either a compressed air or a substrate material is used for supplying the coating material to the spraying unit, respectively for expelling it from the spraying head. At this point, in response to the electric force field, which is generated by the electrostatic charging of the test object relative to the spraying head, the dispersed coating material moves toward the test object, the coating material being thereby deposited on the surface of the test object. This is followed by a drying of the coating and a corresponding postprocessing operation. A drying period is required to allow the substrate material to evaporate from the surface of the test object, particularly when the coating material, such as titanium dioxide, for example, had been applied to the test object via a substrate material, such as a water and ethanol mixture.

The optical measuring operation, as well as the electronic further processing of the measurement data are carried out in a last method step. The test object is measured three-dimensionally within a navigation volume relative to a reference coordinate system, the test object being recorded by a suitable camera using the fringe projection and triangulation principle. The image from the camera is subsequently analyzed and stored in a device for digitizing and storing image sequences; from the generated data record, it being possible to produce a surface or volume model which has values in the low micrometer range and is, therefore, characterized by a very high accuracy.

The present invention is not limited in its practical implementation to the preferred exemplary embodiment indicated above. Rather, a number of variants which utilize the described approach are conceivable, even in the context of fundamentally different executions.

What is claimed is:

1. A method for optically measuring a surface having a spherical form and a high reflection of radiation comprising:
   illuminating a spherical surface by at least one radiation source and by at least one structured light source;
   producing an illumination structure on the surface to be measured;
   recording the illumination structure using a camera;
   applying a coating to the surface via an electrostatic coating process to reduce the reflected radiation; and
   measuring the surface.

2. The method as recited in claim 1, wherein the step of applying a coating to the surface via an electrostatic coating process includes a white scattering and/or diffusely scattering layer.

3. The method as recited in claim 1, wherein the step of applying a coating to the surface via an electrostatic coating process includes applying the coating as a pulverulent material.

4. The method as recited in claim 1, wherein the step of applying a coating to the surface via an electrostatic coating process includes applying a coating of a titanium dioxide.

5. The method as recited in claim 3, wherein the step of applying the coating as a pulverulent material is performed by depositing the pulverulent material on the surface using compressed air.

6. The method as recited in claim 3, wherein the step of applying the coating as a pulverulent material is performed by depositing the pulverulent material on the surface via a substrate material.

7. The method as recited in claim 6, wherein the substrate material contains a mixture of water and ethanol.

8. A device for performing the step of applying a coating to the surface of an object via an electrostatic coating process to reduce the reflected radiation as recited in claim 1 comprising:
   an electrostatic coating device.

9. The device as recited in claim 8, wherein the electrostatic coating device has a spraying unit to discharge a coating material onto the object, a high voltage being applied between the spraying unit and the test object.

10. The device as recited in claim 9, wherein the spraying unit is movable relative to the object to be coated in order to achieve a uniform layer thickness of the coating.

11. The device as recited in claim 10, wherein the uniform layer thickness of the coating is less than 0.01 mm.

* * * * *